United States Patent [19]

Frechette

[11] Patent Number: 4,901,990
[45] Date of Patent: Feb. 20, 1990

[54] MACHINE TOOL FIXTURE WITH AIR SUPPLY SYSTEM

[76] Inventor: Simon P. Frechette, 1641 Buchanan St., Topeka, Kans. 66604

[21] Appl. No.: 54,309

[22] Filed: May 26, 1987

[51] Int. Cl.4 .............................................. B23Q 7/00
[52] U.S. Cl. ......................................... 269/25; 269/20; 269/900; 269/305
[58] Field of Search ............... 269/25, 20, 900, 21, 269/305, 253; 251/580; 285/136, 190

[56] References Cited

U.S. PATENT DOCUMENTS

| | | | |
|---|---|---|---|
| 1,985,012 | 12/1934 | Boehm | 285/190 |
| 4,445,675 | 5/1984 | Kitaura | 269/20 |
| 4,610,440 | 9/1986 | Casset | 269/20 |
| 4,664,366 | 5/1987 | Lane | 269/900 |

Primary Examiner—Judy Hartman
Attorney, Agent, or Firm—Kokjer, Kircher, Bradley, Wharton, Bowman & Johnson

[57] ABSTRACT

A fixture for accurately locating a workpiece during machining operations. A table includes a plurality of frusto-conical openings arranged in a grid pattern to receive locator pins each having a frusto-conical base to seat closely in the opening in which it is inserted. The locator pins establish stops against which some parts of the workpiece are positioned. The workpiece is held against the pins by power cylinders carried on special pegs that can be inserted in the table openings. Air for operating the cylinders is made available to each opening through a valved line and a passageway extending to each opening in the table. Each peg has a passage arranged to receive the incoming fluid from the opening and to transmit the air to its cylinders to extend them against the workpiece.

12 Claims, 2 Drawing Sheets

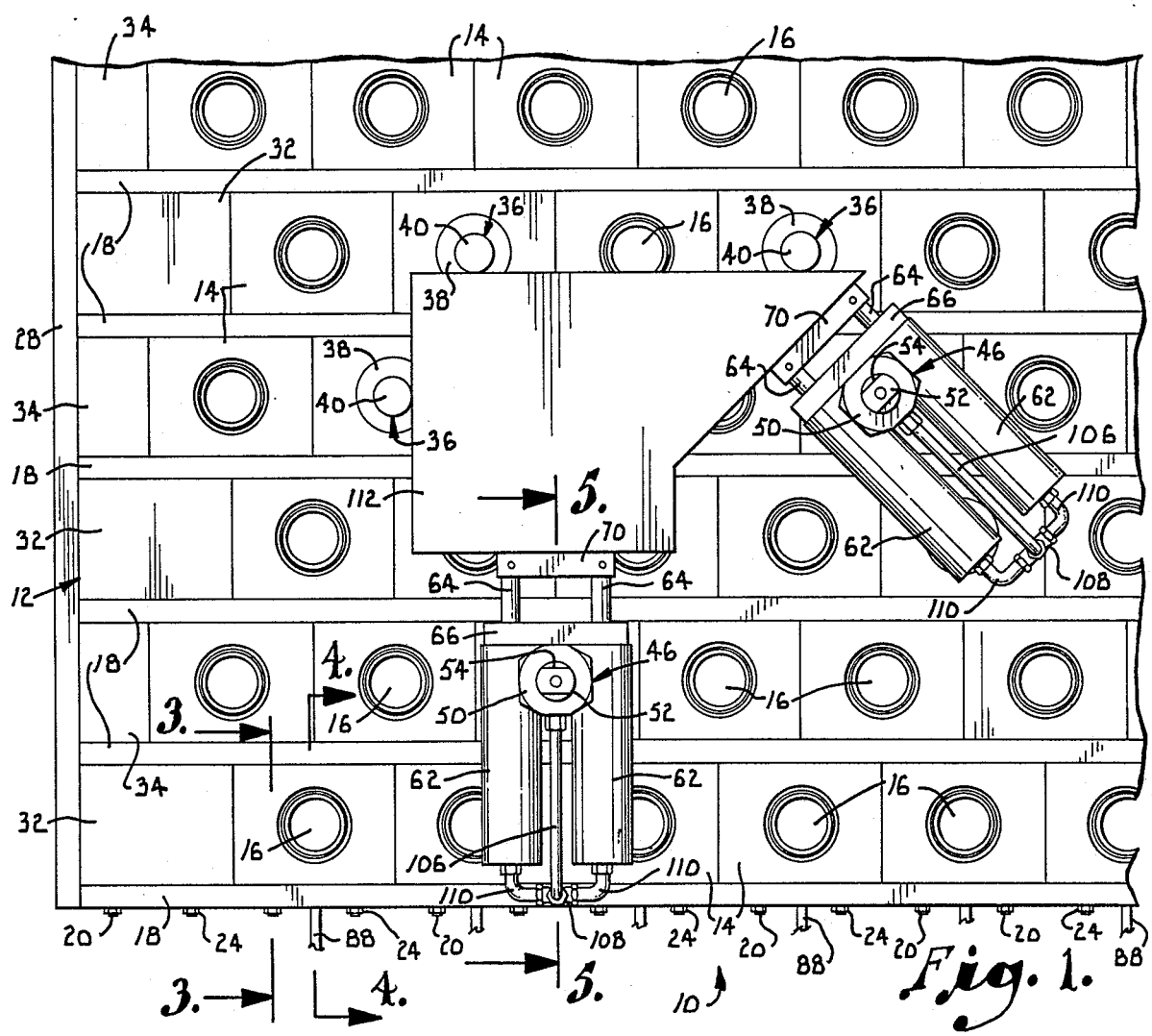

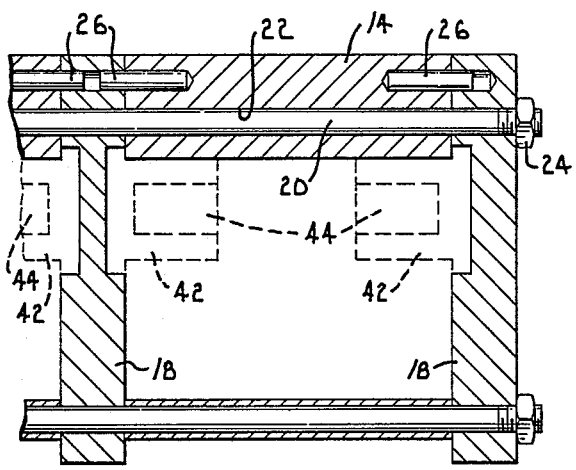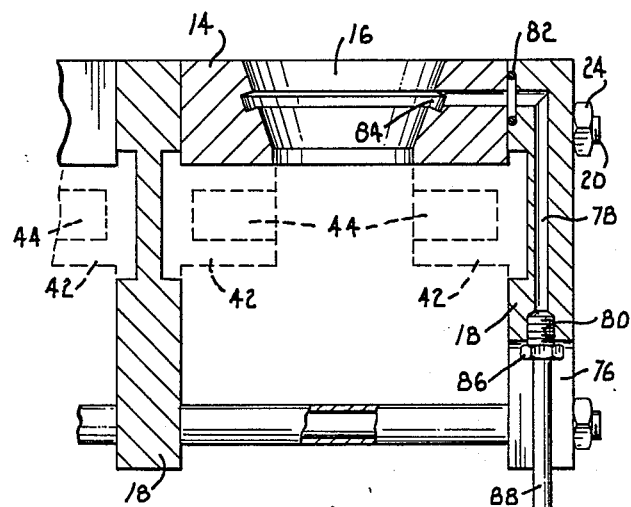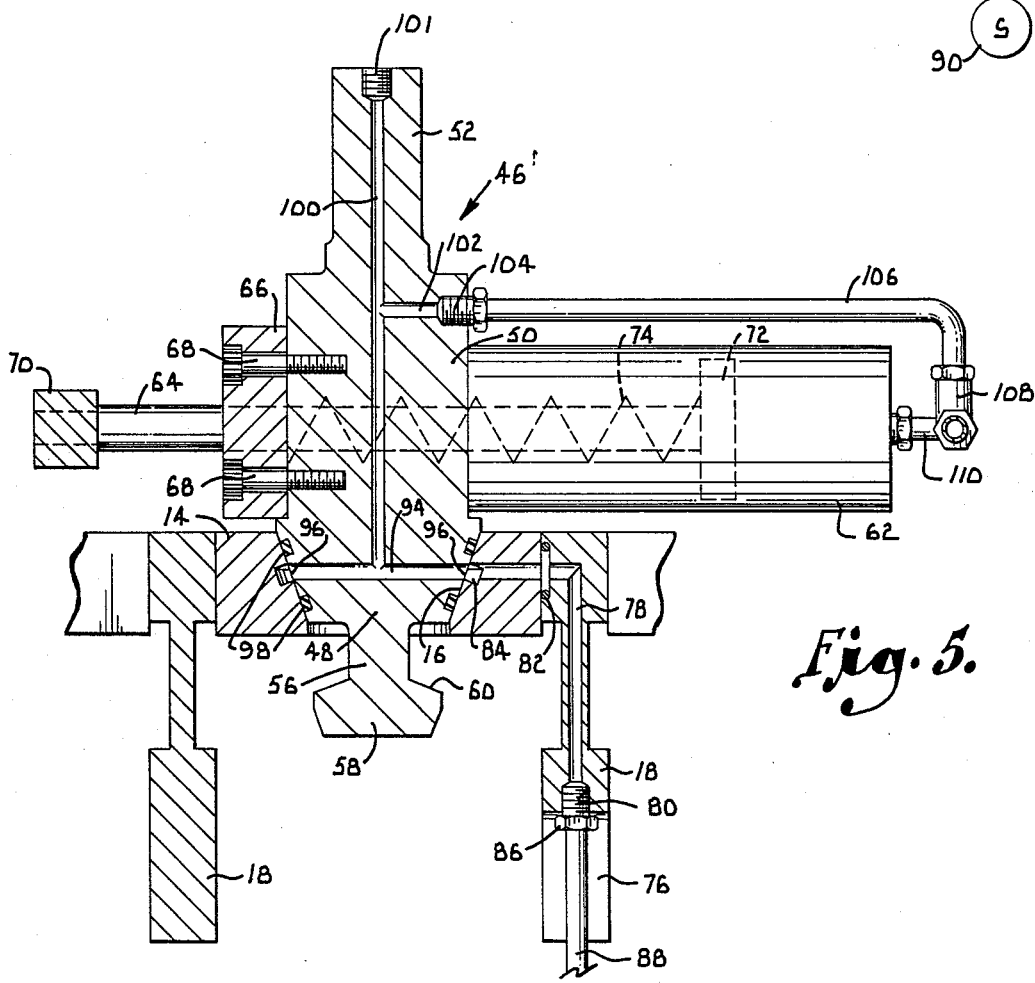

MACHINE TOOL FIXTURE WITH AIR SUPPLY SYSTEM

BACKGROUND AND SUMMARY OF THE INVENTION

This invention relates generally to fixtures for positioning workpieces on machine tools and more particularly to a fixture which is equipped with a pneumatic system for accurately positioning workpieces on a machine tool table.

Pending application Ser. No. 852,565, filed Apr. 16, 1986 by Lane et al. and owned by the assignee of the present application, discloses a fixture system which is specially constructed to be set up by robotic machines. The work table of the machine tool is provided with openings arranged in a grid pattern in order to receive removable locator pins that act as stops against which workpieces can be positioned. Because the openings have known locations, the location of a workpiece placed against the pins inserted in the openings is known. Consequently, machine tool operations such as drilling and milling can be carried out accurately by the tool head. The system disclosed in the aforementioned application is especially well suited for robotic machines because the openings and pins are tapered and the pins do not have to be precisely aligned with the openings in order to be inserted into them. Accordingly, the inability of robotic machines to precisely align the pins with the openings is not a severe handicap since all that is required is for the alignment to be close enough to allow the tapered portions of the pins to seat themselves in the tapered openings.

Special measures are required to enable the fixture system described above to be useful in the machining of different parts. For example, parts that are unusual or irregularly shaped must be held closely between pins which are inserted in the openings in the work table. However, if the dimensions of the part are such that the part does not exactly span the openings, then the simple locator pins are not able to securely hold the part in a fixed position. The present invention is directed to a fixture system in which all parts can be securely held in a fixed and known position on the work table.

In accordance with the invention, some of the sides of a workpiece are positioned against locator pins which are fitted in selected openings in the work table. Other openings receive specially constructed pegs that are equipped with pneumatic cylinders. The ends of the cylinder rods carry guide blocks which can be extended against the workpiece in order to maintain it against the locator pins such that the workpiece is held in a known position while drilling, milling or other machining operations are carried out. These special pegs have conical bases so that robotic machines can insert them into selected openings in the table without first aligning them precisely with the openings.

It is a particular feature of the invention that air for operating the pneumatic cylinders is made available at each opening and can be selectively applied only to those openings in which a peg is seated. Air passageways are formed through the table, and each passageway leads to one of the openings in the table. Pneumatic lines which supply the individual passageways are equipped with valves which permit the air flow pattern to be adjusted to apply air only to the openings which receive a peg. Each opening has an annular groove which receives the air supplied to the opening.

Each peg has an air passage which directs air to the cylinders from the groove of the opening in which the peg is received. Diametrically opposed ports in the conical base of the peg form air inlets which admit air to the passage in the peg, and the ports register with the annular groove regardless of the rotative orientation of the peg in the opening. Consequently, each peg that is fitted in an opening receives air for operation of its cylinders whenever the corresponding valve is open. The application of air to the cylinders results in extension of the guide block against the workpiece, and the air pressure holds the workpiece firmly in place against the locator pins during machining operations.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary top plan view of a machine tool fixture constructed according to a preferred embodiment of the invention, with a workpiece held in place on the fixture table in order to be machined;

FIG. 2 is a fragmentary perspective view of the worktable of the fixture;

FIG. 3 is a fragmentary sectional view on an enlarged scale taken generally along line 3—3 of FIG. 1 in the direction of the arrows;

FIG. 4 is a fragmentary sectional view on an enlarged scale taken generally along line 4—4 of FIG. 1 in the direction of arrows; and FIG. 5 is a fragmentary sectional view on an enlarged scale taken generally along line 5—5 of FIG. 1 in the direction of the arrows.

DETAILED DESCRIPTION OF THE INVENTION

Referring now to the drawings in more detail and initially to FIGS. 1 and 2, numeral 10 generally designates a machine tool fixture constructed in accordance with the present invention. The fixture 10 includes a table 12 which may be formed by a plurality of individual rectangular plates 14 each equipped with a frusto-conical opening 16. The plates 14 are arranged in rows, and each row of plates is held between a pair of vertical plates 18 which form part of the frame of the table 12. As best shown in FIG. 3, elongated bolts 20 are extended through all of the frame plates 18 and through passages 22 formed through each plate 14 in order to secure the components of the table assembly together. Nuts 24 are threaded onto the opposite ends of each bolt 22 and are tightened against the end plates 18. Dowel pins 26 also connect each plate 14 with the adjacent plates 18 in order to provide assistance in maintaining the alignment of the table.

The plates 14 in each row are offset relative to the plates in the adjacent row or rows. The distance of the offset is equal to one-half the length of each plate 14, as best shown in FIG. 1. This arrangement locates the openings 16 in a generally hexagonal pattern with one of the openings 16 located at the center of the hexagon formed by the surrounding openings. This hexagonal pattern of the openings 16 is preferred, although the openings can be arranged in other grid patterns as well.

The frame of the table includes a pair of vertical end plates 28 which are secured to the edges of each plate 18 by screws 30 (See FIG. 2). At each end of each row of plates 14, either a full size plate 32 or a half size plate 34 is secured adjacent to the end plate 28. The plates 32 and 34 are solid plates and do not have openings. The half size plates 34 accommodate the staggered or offset arrangement of the plates 14 in adjacent rows. Plates 32 and 34 are secured on the table by bolts 20 and nuts 24 in the same manner described earlier in connection with plates 14.

The table 12 presents a flat, horizontal working surface into which the openings 16 extend. Each opening 16 is generally frustoconical and tapers as it extends downwardly into the table surface. It should be noted that the table 12 can be constructed as a continuous plate rather than as individual plates connected together.

The fixture includes a plurality of locator pins 30 which may be of the same general construction as the pins shown in copending application Ser. No. 852,565, filed Apr. 16, 1986 by Lane et al. and owned by the assignee of the present application. The locator pins 36 include frustoconical bases 38 which have the same size and shape as the frustoconical openings 16 in order to seat closely therein. Each locator pin 36 also includes an upwardly projecting pin element 40 which forms a stop against which a workpiece on the table can be positioned. The pins 36 include downwardly projecting shanks and buttons (not shown) which may be identical to those shown in the aforementioned Lane et al. application.

As best shown in FIGS. 3 and 4, the fixture includes latch mechanisms between each adjacent pair of plates 18. Each latch mechanism includes a flanged channel 42 which is secured to plate 18 and which is equipped with sliding bar 44 that engages the latches against the button (not shown) on the bottom of each locator pin 36. The aforementioned application to Lane et al. is incorporated herein by reference, and reference may be made to it for an understanding of the details of construction and the manner in which the latch mechanisms interact with the buttons on the locator pins.

In accordance with the present invention, the fixture 10 is equipped with a plurality of pegs which are generally designated by numeral 46. With particular reference to FIG. 5, each peg 46 has a frustoconical base 48 which is substantially equal in size and shape to each opening 16. Consequently, each peg 46 can be inserted into each of the openings 16 and seats closely therein in the seated position shown in FIG. 5. The main body 50 of each peg 46 extends upwardly from base 48 and projects well above the surface of table 12 when the peg is seated in one of the openings 16. A generally cylindrical handle 52 extends upwardly from the body 50 of each peg and is provided on one side with flat surface 54 (see FIG. 1) having a function that will subsequently be described.

The lower portion of each peg 46 includes a cylindrical shank 56 which projects downwardly out of opening 16 from the bottom of base 48. An enlarged button 58 is carried on the lower end of each shank 56. Each button 58 has a beveled upper surface 60 against which the latch mechanisms of the fixture act in the same manner as occurs with the locator pins 36. Consequently, each peg 46 which is inserted in one of the openings 16 can be securely yet releaseably held down in the opening by the latch mechanisms.

Each peg 46 carries a pair of fluid operated cylinders 62 which extend horizontally and parallel to one another on opposite sides of the peg. The cylinders 62 fit closely in curved areas on the body 50 of each peg. Each cylinder 62 includes an extensible and retractable rod 64 which extends out of the cylinder and through a mounting block 66 which is secured to the body 50 of the peg by a pair of screws 68. The two cylinders 62 on each peg act in concert with another, and the two rods carry a guide block 70 which is generally rectangular and which extends horizontally between the rods 64. The leading end of each block 70 is a flat surface which engages workpieces placed on table 12, as will be described more fully.

With continued reference to FIG. 5 in particular, each cylinder 62 has an internal piston 72 from which its rod 64 extends. Each piston 72 fits tightly in its cylinder and is driven forwardly to extend the rod 64 when air pressure is applied to the base end of the cylinder. A compression spring 74 is coiled around rod 64 within the cylinder and acts to retract rod 64 automatically when the air pressure in the base end of the cylinder is relieved. The rods 64 can be extended to varying lengths, depending upon the particular application.

The fixture 10 is equipped with a fluid system which makes air pressure available at all times to each of the openings 16. A plurality of rectangular notches 76 are formed in the lower edge of each of the frame plates 18. Each notch 76 corresponds with one of the openings 16, and an air passageway 78 extends in the table 12 from each notch 76 to the corresponding opening 16. As shown in FIGS. 4 and 5, each passageway 78 has an internally threaded inlet port 80 located at the base of the corresponding notch 76. The passageway 78 extends vertically into plate 18 and then horizontally. A portion of the horizontal run of each passageway is formed in the corresponding plate 14. An 0 ring 82 provides a seal at the junction between plate 18 and each plate 14 in order to prevent air leakage at the joint. Each passageway 78 extends to connection with an annular groove 84 which is formed in plate 14 to extend around the opening 16. Groove 84 is located approximately midway of the thickness of plate 14.

A fitting 86 is threaded into each of the ports 80, and a flexible pneumatic line 88 extends to each fitting 86. Accordingly, each of the openings 16 has its own pneumatic line 88. As shown diagrammatically in FIG. 4, a source 90 of compressed air or hydraulic fluid connects with each pneumatic line 88 through a valve 92. When the valve 92 for each line 88 is open, fluid is applied through the valve and through line 88 and the passageway 78 to the groove 84 of the corresponding opening. When valve 92 is closed, the fluid pressure at the corresponding groove 84 is relieved. Thus, fluid can be selectively applied to any one or more of the openings 16 by opening the valves 92 for the selected openings and closing the remaining valves.

Referring again the FIG. 5, each peg 46 is provided with a fluid passage which directs the incoming air from groove 84 to the cylinders 62 mounted on the peg. A horizontal passage 94 extend across the base 48 of each peg and presents at its opposite ends a pair of inlet ports 96 which are at diametrically opposed locations on the base. Each port 96 is located adjacent to and in direct communication with the groove 84 when base 48 is seated in opening 16. The base 48 of each peg carries a pair of spaced apart 0 rings 98 which provide seals between the base and plate 14 at locations above and below groove 84 when the base is seated in opening 16.

Thus, fluid which is applied to groove 84 is able to enter the ports 96, and the 0 rings 98 prevent fluid leakage.

A vertical passage 100 extends axially in each peg 46 and intersects at its lower end with the center of passage 94. A plug 101 is threaded into the top of handle 52 in order to close passage 100 at the top. A short horizontal passage 102 intersects with passage 100 and extends generally radially within the body 50. A fitting 104 is threaded into the outer end of passage 102 and connects with a conduit 106 which leads to a tee fitting 108 located near the base ends of the two cylinders 62. A pair of elbows 110 connect with the two branches of fitting 108 and lead to the base ends of the cylinders 62.

In use of the fixture 10, table 12 forms the work table of a machine tool such as a drilling or milling tool which is to perform a machining operation on a workpiece such as the workpiece identified by numeral 112 in FIG. 1. The workpiece is placed on the upper working surface of table 12, and one or more of the locator pins 36 are inserted into selected openings 16 in order to establish stops against which one or more of the sides of the workpiece are positioned. For example, FIG. 1 illustrates three locator pins 36 inserted into three of the openings 16, and adjacent sides of the workpiece 112 are positioned against the pins 36.

It is noted that the other sides of the workpiece are not properly located such that the workpiece can be held in place by locator pins 36 alone. Accordingly, it is necessary to use the pegs 46, and in the case of workpiece 112 and of the example shown in FIG. 1, it is necessary to apply two of the pegs to two of the selected openings 16.

The pegs 46 are inserted into the proper openings 16, and the valves 92 for the selected openings 16 are then opened, while all other valves 92 remain closed. Consequently, air is made available only to the two selected openings 16.

Compressed air from the source 90 passes through the valves 92 for the selected openings 16, and the air flow to each opening occurs through line 82 and passageway 78 to the groove 84 which extends around the opening. From groove 84, the air enters the two ports 96 and flows in passage 94 to passage 100, then through passage 102 and through conduit 106, tee fitting 108 and the two elbows 110 to the base ends of both cylinders 62 which are carried on the peg. The application of air to the base ends of the cylinders acts against the pistons 72 and moves the pistons forwardly against the force of the return springs 74. The two piston rods 64 then extend in unison and advance the guide block 70 against the adjacent side of the workpiece 112.

In this manner, the guide blocks 70 of the two pegs 46 are advanced against the adjacent sides of the workpiece 112, and the air pressure holds the workpiece securely against the locator pins 36 while machining operations are subsequently carried out on the workpiece. It is noted that the locations of all three locator pins 36 are known since the pins are centered in the openings 16 and the locations of which are fixed and known. Consequently, the locations of the edges of the workpiece which engage pins 36 are known, and the machine tool can be controlled such that the machining operations are carried out at a location measured from the two edges of the workpiece which are held against the locator pins 36. Thus, the machining operations can be carried out at exact locations on the workpiece.

After the machining operations have been completed, the two valves 92 which have been held open are closed, and the air pressure is then relieved from the cylinders 62. The return springs 74 force pistons 72 to retract the piston rods 64, thus withdrawing the guide blocks from the workpiece. The workpiece can then be removed from table 12 and subsequent machining operations can be carried out on additional workpieces of the same or a different size and shape.

The fixture 10 is specially constructed such that it can be set up by robotic machines. Because the base 38 of each locator pin 36 and the base 48 of each peg 46 is frustoconical, the pins and pegs can be properly seated in selected openings 16 without requiring them to be precisely aligned with the openings before being inserted. The frustoconical shapes of the bases and openings result in the pins and pegs seating themselves so long as they are aligned closely enough to initially at least partially enter the openings. As a consequence, despite the fact that robotic machines have difficulty in exactly aligning pins with openings, robotic machines are able to apply the pins and pegs to the proper openings and to thus set up the fixture for each different workpiece that is to be machined.

It is contemplated that the valves 92 will be controlled by a computer which receives information as to which openings 16 receives the pegs 46. Although fluid is made available to each of the openings 16, only the openings in which a peg is seated are actually supplied with fluid by opening the appropriate valve 92. Therefore, the compressed fluid is conserved and only the air required for operation of the cylinders 62 is used.

The flat side 54 of each handle 52 is oriented parallel with the leading surface of block 70. Thus, a robotic machine can place pegs 46 in openings 16 in the proper rotative orientation by properly adjusting the orientation of the flat side 54. For example, the peg of the block 70 which contacts the angled side of workpiece 112 can be properly oriented in its opening by orienting side 54 parallel to the angled side of the workpiece. It is important to note that the pegs 46 must be oriented at various rotative positions in order to accommodate varying workpieces. This is permitted while always supplying fluid to the peg because the annular groove 84 is able to supply ports 96 regardless of the rotative orientation of the peg.

The locator pins 36 and pegs 46 can be used in various numbers and various combinations to hold workpieces at virtually any desired location and orientation on the table 12, regardless of the size and/or shape of the workpiece. At the same time, the exact location of the workpiece is known because the locations of the locator pins 36 which engage it are known. Consequently, the machine tool can perform machining operations at the exact location required. Again, it is contemplated that a computer will be used to adjust the machine tool to the necessary location for machining of the part.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, We claim:

1. A machine fixture for locating a workpiece relative to a machine tool, said fixture comprising:
   a table having a working surface;
   a plurality of openings in said working surface arranged in a grid pattern thereon;
   a plurality of pegs each having a body portion and a size and shape to be inserted in each of said openings with the body portion of the peg disposed out of the opening;
   a power operated actuator mounted on the body portion of each peg, said actuators having respective guide elements movable by the actuators into engagement with selected portions of the workpiece to hold the workpiece in a selected location on the table for machining operations carried out by the tool; and
   means for applying power to each actuator when the corresponding peg is inserted in any opening, said power applying means being operable to apply power to each of said openings and through any peg inserted therein to the actuator mounted on the peg.

2. The fixture of claim 1, wherein:
   said actuator comprises a fluid powered actuator; and
   said power applying means comprises means for applying fluid under pressure to each actuator when the corresponding peg is inserted in any opening.

3. The fixture of claim 2, wherein said power applying means comprises:
   a plurality of fluid passageways in said table each communicating with one of said openings to apply fluid thereto;
   means for selectively applying fluid under pressure to each passageway; and
   a fluid passage in each peg having one end disposed to receive fluid from the passageway communicating with the opening in which the peg is inserted and another end disposed in communication with the actuator on the peg to supply fluid thereto when fluid under pressure is applied to the corresponding passageway.

4. The fixture of claim 3, including:
   an annular groove extending around each opening and communicating with the corresponding passageway to receive fluid therefrom;
   a port in each peg forming an inlet to the passage of the peg and disposed to communicate with the groove of each opening in which the peg is inserted; and
   means for sealing each peg to the table at locations on opposite sides of the groove of each opening in which the peg is inserted.

5. The fixture of claim 4, wherein said sealing means comprises a pair of seal rings carried on each peg at locations on opposite sides of the groove of each opening in which the peg is inserted.

6. The fixture of claim 1, including a plurality of locator pins each having a size and shape to be inserted in each of said openings with the pins projecting from the working surface to establish stops against which the workpiece can be held by the guide elements.

7. A machine fixture for locating a workpiece relative to a machine tool, said fixture comprising:
   a table having a working surface for receiving the workpiece, said working surface presenting a plurality of openings arranged in a grid pattern;
   a plurality of locator pins each having a size and shape to be inserted in each of said openings with the pins projecting from said working surface to establish stops against which selected portions of the workpiece can be positioned;
   a plurality of fluid passageways in said table each communicating with a different one of said openings to apply fluid thereto;
   means for selectively applying fluid under pressure to each of said passageways to supply the fluid to the openings which are in communication with the passageways selected to receive fluid;
   a plurality of pegs each having a base portion for insertion into each of the openings, each peg having a body portion disposed out of the opening in which the base portion of the peg is inserted;
   a fluid operated actuator on the body portion of each peg, each actuator having an extensible and retractable rod driven under the influence of fluid applied to and relieved from the actuator;
   a guide element on each rod engageable, when the rod is extended, with other selected portions of the workpiece to hold the workpiece in a selected location between said locator pins and said guide elements during machining operations effected by the tool; and
   a fluid passage in each peg located and arranged to direct fluid to the actuator on the peg from the passageway which communicates with the opening in which the base portion of the peg is received.

8. The fixture of claim 7, including:
   an annular groove extending around each opening and communicating with the corresponding passageway to receive fluid therefrom;
   a port in each peg forming an inlet to the passage of the peg and disposed to communicate with the groove of each opening in which the peg is inserted; and
   means for sealing each peg to the table at locations on opposite sides of the groove of each opening in which the peg is inserted.

9. The fixture of claim 8, wherein said sealing means comprises a pair of seal rings carried on the base of each peg and disposed to be located on opposite sides of the groove of each opening in which the peg is inserted.

10. The fixture of claim 7, wherein:
    each opening has a substantially frusto-conical configuration and tapers as it extends into the table; and
    the base portion of each peg has a generally frusto-conical configuration and a size to seat closely in each opening in which it is inserted.

11. The fixture of claim 10, including:
    an annular groove extending around each opening and communicating with the corresponding passageway to receive fluid therefrom;
    a port in the base portion of each peg forming an inlet to the passage of the peg, each port communicating with the groove of each opening in which the base portion is inserted at all rotative positions of the peg; and
    means for sealing the base portion of each peg to the table at locations on opposite sides of the groove of each opening in which the peg is inserted.

12. A machine fixture for locating a workpiece relative to a machine tool, said fixture comprising:
- a table having a working surface;
- a plurality of openings in said working surface arranged in a grid pattern each opening having a generally frusto-conical configuration and tapering as it extends into said surface;
- a plurality of locator pins each having a generally frusto-conical base and a pin element, each pin being insertable in each opening with the base of the pin seating closely in the opening and the pin element projecting from said working surface to establish a stop against which the workpiece can be positioned;
- a plurality of fluid passageways in said table each having an end adjacent a different one of said openings;
- a generally annular groove in said table extending around each of said openings and communicating with the corresponding passageway to receive fluid therefrom;
- means for selectively applying fluid pressure to each passageway;
- a plurality of pegs each having a generally frusto-conical base portion for insertion into each of said openings, each peg having a body portion disposed out of the opening in which the base portion of the peg is inserted;
- a power cylinder on each peg, each cylinder having a fluid driven rod which extends and retracts relative to the cylinder;
- a guide element on each rod extendable therewith against the workpiece to hold the workpiece in place on the table between the locator pins and guide elements;
- a port in the base portion of each peg located adjacent the groove of the opening in which the base portion is received at all rotative positions of the peg, thereby transmitting fluid pressure from the groove to the port; and
- a fluid passage in each peg having one end communicating with said port and anther end communicating with the cylinder on the peg, whereby fluid pressure can be transmitted to each cylinder having the corresponding peg inserted in one of the openings.

* * * * *